United States Patent [19]

Jaekel

[11] 4,112,959
[45] Sep. 12, 1978

[54] ADJUSTABLE CHECK VALVE

[76] Inventor: Gunter R. Jaekel, 44 Coral Gable Dr., Weston, Ontario, Canada

[21] Appl. No.: 789,992

[22] Filed: Apr. 22, 1977

[51] Int. Cl.² .............. F16K 31/363; F16K 15/04
[52] U.S. Cl. .................. 137/504; 137/514; 137/539.5; 137/606; 137/614.2
[58] Field of Search ............ 137/513, 514, 514.5, 137/514.7, 539, 539.5, 506, 606, 494, 496, 497, 501, 503, 504, 614.2

[56] References Cited

U.S. PATENT DOCUMENTS

| 2,044,629 | 6/1936 | Parker | 137/513 |
| 2,566,774 | 9/1951 | Otis | 137/503 X |
| 2,646,066 | 7/1953 | Nemetz | 137/506 X |
| 2,969,084 | 1/1961 | Raymond | 137/539.5 X |
| 3,114,387 | 12/1963 | Barkan et al. | 137/494 |
| 3,234,959 | 2/1966 | Feinberg | 137/606 X |
| 3,587,630 | 6/1971 | Parquet | 137/504 |
| 3,665,957 | 5/1972 | Fulmer et al. | 137/539.5 X |
| 3,747,635 | 7/1973 | Garamy | 137/539.5 |

Primary Examiner—William R. Cline
Attorney, Agent, or Firm—Ridout & Maybee

[57] ABSTRACT

A smoothly acting adjustable fluid flow check valve comprises an adjustably spring biased ball valve member, a piston upstream of the ball valve member and having a stem acting as an actuator for the ball valve member and as a further valving member actually controlling the volume of fluid passing through the check valve, the piston moving in a cylinder surrounding the stem so as to damp the movement of the latter.

4 Claims, 2 Drawing Figures

ADJUSTABLE CHECK VALVE

FIELD OF THE INVENTION

This invention relates to adjustable check valves for use in fluid supply systems. Whilst particularly useful for mixing water from hot and cold water supply systems, the valve of the invention is by no means confined to that application and may be used to control the flow of both liquids and gases.

BACKGROUND OF THE INVENTION

In U.S. Pat. No. 2,830,612, there is described an anti-condensation device for a flush tank in which hot water is injected into a cold water supply to the tank through a check valve and a restrictor orifice. I have experimented with this device and have found that whilst preventing condensation it leaves several problems unsolved. The form of check valve employed is very prone to chatter, resulting in a noise problem, and there is nothing to prevent hot water from entering the cold water supply in the event of a pressure drop in the latter. Furthermore, the device is not adjustable.

I am aware of the check valve structure disclosed in U.S. Pat. No. 2,044,629 to Parker in which two valve members are arranged in series, one of the valve members being movable relative to the other within a chamber forming part of the fluid path from inlet to outlet of the valve structure so as to provide a dashpot effect on opening or closing of the valve. I am also aware of U.S. Pat. No. 2,682,890 to May for a safety valve in where a piston operated by the pressure of fluid upstream of the valve acts as a lifter for the valve, and U.S. Pat. No. 2,646,066 to Nemetz for a check valve for lubrication systems in which a first valve member in the form of a piston acts as a lifter for a second ball-type valve. However, none of these valves operates or is constructed in the same manner as that now to be described, nor do they have the same purpose, which is here to provide a simple yet smoothly and silently operating adjustable check valve.

SHORT DESCRIPTION OF THE INVENTION

According to the present invention, a check valve comprises a valve housing having an inlet and an outlet, a valve seating in the housing defining a passage between inlet and outlet chambers defined in said housing, a ball valve seatable on the seating on the outlet side thereof, a compression spring urging the ball onto the seat, a spring abutment adjustably mounted in the housing, the spring acting between the ball and the abutment to apply an adjustable bias to said ball tending to retain it on said valve seat, a cylinder defined in the housing between the inlet and the valve seat, a piston having a path of movement in said cylinder and having a stem extending into and substantially closing the passage defined by the valve seating, leakage path means placing in communication the portions of the cylinder on either side of the piston, and passageway means defined by the piston and extending from an inlet on the side of the piston nearest the inlet through the stem to at least one outlet in the side of the stem and so positioned that at one end of the path of movement of the piston the outlet is within the passage in the valve seating and at the other end of the travel of the piston is on the outlet side of the valve seat, the end of the stem being engageable with the ball valve member. With this arrangement, although the primary closure of the valve is by the ball valve member, the principal fluid flow through the valve is through the passageway in the stem and the side outlet or outlets in the latter. The rate of flow through the valve is thus regulated by the piston, whose movements are damped to an extent determined by the magnitude of the leakage path therepast, thus enabling any necessary degree of damping required to prevent chatter and erratic operation to be applied without restricting flow through the valve. The pressure drop occurring across the valve may be adjusted by moving the adjustable abutment.

The valves may be used in pairs, for example in hot and cold water supplies to a flush tank, in which case they will act both accurately to proportion the hot and cold water supplied to the tank and to prevent any communication between the hot and cold water systems.

SHORT DESCRIPTION OF THE DRAWINGS

A preferred embodiment of the invention is shown in the accompanying drawing, in which.

DESCRIPTION OF THE PREFERRED EMBODIMENTS

Figure 1:
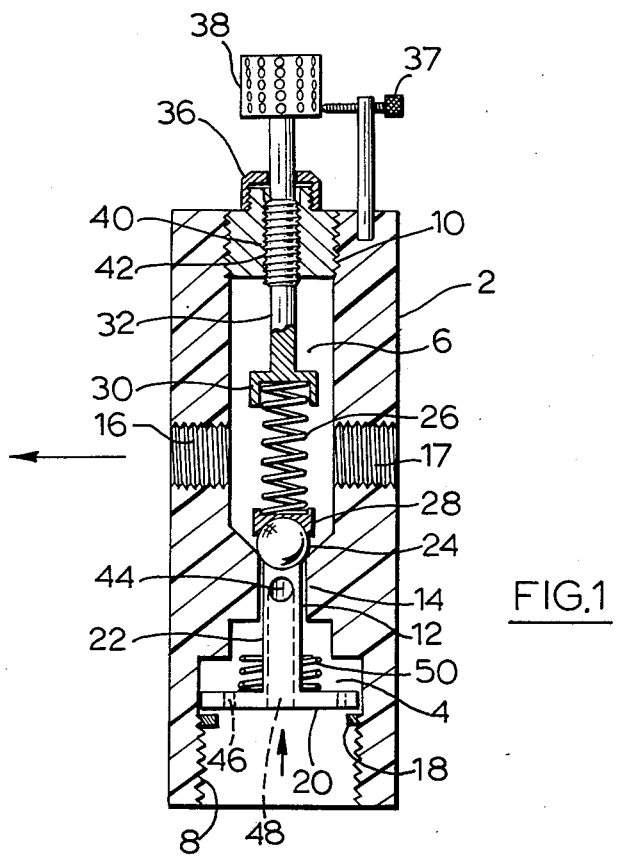
FIG. 1 shows a single check valve in section.

The valve shown in FIG. 1 comprises a body 2, which may be formed of metal, or of a high strength moulded plastics material such as a glass loaded acetal resin such as is available under the trade mark DELRIN from DuPont. The body is formed with a bore from one end forming an inlet chamber 4 and a bore from the other end forming an outlet chamber 6, both bores having threaded portions 8, 10 respectively at their outer ends. The bores are connected by a further bore 12 forming a passage between the chambers 4 and 6 through a valve seat 14. A tapped side outlet 16 in the housing into chamber 6 receives an outlet pipe (not shown) from the valve, whilst an inlet pipe (not shown) engages the threaded portion 8. An additional side orifice 17 may be provided for purposes to be discussed below. The threaded portion 8 also receives a retainer ring 18 which renders a piston 20 captive within a cylinder formed by the chamber 4, the piston having a stem 22 which extends into and substantially closes the passage 12. The outer end of the stem is recessed to engage a ball valve member 24 normally held in fluid tight engagement with the valve seat 14 by a spring 26 acting between a cup 28 resting on the ball and an abutment in the form of a cup 30 on the end of a stem 32.

The stem 32 has a screw threaded portion 42 engaging an internal thread 40 on a plug 34 which has an external thread engaging the thread 10. A gland nut 36 retains liquid tight packing around the stem 32, which has an operating knob 38 at its outer end. By means of the knob 38, the position of the cup 30 may be adjusted, thus altering the pressure applied to the ball 24 tending to keep it seated. A locking device as shown at 37, or of any other suitable alternative design may be used to retain a desired setting. The piston 20 has a passageway 48 extending from the side of the piston nearest the inlet end of the valve through the stem 22 to an outlet 44 in the side of the stem. Preferably there are two diametrically opposite outlets, which are normally masked by the seat 14. Small drillings 46 in the piston provide a leakage path between its opposite sides: they may be replaced by notches in the edge of the piston or by slightly reducing the diameter of the piston so as to provide the desired leakage path. Interchangeable pistons with calibrated drillings may be selected so as to provide desired forward flow characteristics. A spring 50 surrounds the stem 22 and is dimensioned so as to arrest the piston at the end of its upward stroke. Other alternative means of cushioning the upward end of the piston stroke could be employed.

When a pressure differential is applied across the valve from inlet to outlet, sufficient for the differential fluid pressure applied directly or indirectly to the ball 24 to overcome the pressure applied thereto by the spring 26, the ball will rise until the spring is compressed so that the pressures applied to the ball are again balanced. If this results in the parts of the outlets 44 rising above the seat 14, fluid will pass from the inlet chamber to the outlet chamber through the passageway 48 at a rate determined both by how far the piston 20 can rise against the increasing pressure of the spring 26 and by how much the pressure drop across the valve falls: unless the spring pressure is low and the back pressure at the outlet 16 is low, the piston assumes some intermediate position with the outlets 44 partly uncovered. Sudden movements or oscillations of the piston 20 are heavily damped since any such movements or oscillations require the displacement or induction of fluid from or into the portion chamber 4 above the piston 20 through the leakage path means 46 and any other leakage paths around the piston 20 and the stem 22. Since the flow through the valve is controlled by the interaction of the openings 44 and the seat 14, there is no sudden cut-off or commencement of flow as the ball 24 seats or unseats, and thus a further source of noisy operation is avoided, whilst additional damping at the fully open position of the valve is provided by the spring 50.

Figure 2:
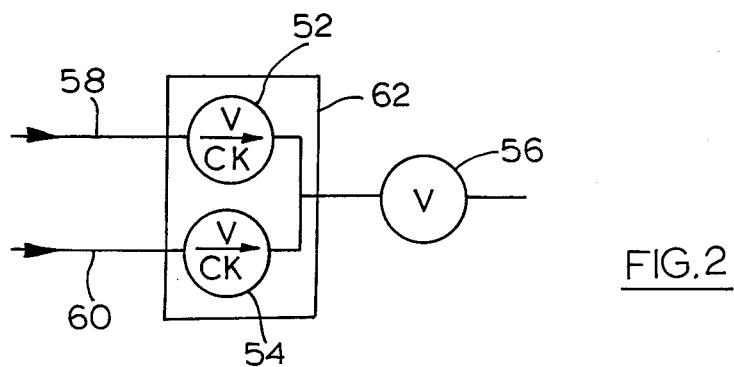
FIG. 2 is a diagram illustrating a use of the valves in accordance with the invention.

Referring to FIG. 2, the valve of the invention will frequently be used as one of a pair of valves 52, 54 upstream of some further valve 56, in order to feed controlled preset amounts of hot and cold water from separate hot and cold supplies 58, 60 to an outlet controlled by the single valve 56. One example already mentioned is the float controlled valve of a flush toilet, whilst other examples are spray nozzles for watering indoor plants where it is desired to avoid the shock of applying very cold water during winter, and shower heads where it is desired to avoid having to set up a predetermined water mix to provide a desired temperature each time the shower is used. In all of these cases, single valve control of the mixed water involves the danger of water from one of the hot and cold systems entering the other unless check valves are provided. The adjustable check valve of the invention enable both the check valve and temperature control functions to be carried out simultaneously in valves which are simple to construct yet stable and quiet in operation. The valves 52 and 54 may have a common housing 62.

The orifice 17 may be used to accommodate a connection to a device 18, which may be a pressure gauge, a pressure switch, or means for introducing additives into fluids leaving the valve. Normally speaking, the valve of the invention will be used in series with and upstream of some further valve, such as the float valve of a flush tank or the control valve of a watering or dispensing valve. The pressure in the outlet chamber 6 will alter according to whether this downstream valve is open or closed, and the pressure gauge or switch will respond to such changes to provide indication or control function. If a dispensing device for additives is used, this may also be pressure controlled so as only to release additives when the pressure in the chamber 6 falls, thus indicating that the downstream valve is open. Such a dispensing device could be another valve in accordance with the invention.

Whilst in the embodiment described, the valve body is of moulded plastics and the remaining parts are preferably of stainless steel, the simple construction of the valve means that it can readily be constructed from alternative materials having appropriate anticorrosive or heat resisting properties if corrosive or very hot fluids are to be handled. Subject to suitable calibration of the leakage path past the piston, the valve works equally as well with gases as with liquids, and will work in any attitude.

What I claim is:

1. A check valve comprising a valve housing having an inlet and an outlet, a valve seating in the housing defining a passage between inlet and outlet chambers defined in said housing, a ball valve seatable on the seating on the outlet side thereof, a compression spring urging the ball onto the seat, a spring abutment adjustably mounted in the housing, the spring acting between the ball and the abutment to apply an adjustable bias to said ball tending to retain it on said valve seat, a cylinder defined in the housing between the inlet and the valve seat, a piston having a path of movement in said cylinder and having a stem extending into and substantially closing the passage defined by the valve seating, leakage path means placing in communication the portions of the cylinder on either side of the piston, and passageway means defined by the piston and extending from an inlet on the side of the piston nearest the inlet through the stem to at least one outlet in the side of the stem and so positioned that at one end of the path of movement of the piston the outlet is within the passage in the valve seating and at the other end of the travel of the piston is on the outlet side of the valve seat, the end of the stem being engageable with the ball valve member.

2. A check valve according to claim 1, wherein the movable abutment comprised a threaded stem rotatable in a threaded plug in the body.

3. A check valve according to claim 1, wherein a cushioning spring is provided between the piston and the valve seat.

4. A check valve according to claim 1, incorporated in an assembly with a similar check valve and a further valve, the inlets of the check valves being connected to hot and cold water supply lines respectively, and their outlets both being connected to the inlet of said further valve.

* * * * *